US009501710B2

(12) United States Patent
Karam et al.

(10) Patent No.: US 9,501,710 B2
(45) Date of Patent: Nov. 22, 2016

(54) SYSTEMS, METHODS, AND MEDIA FOR IDENTIFYING OBJECT CHARACTERISTICS BASED ON FIXATION POINTS

(71) Applicant: Arizona Board of Regents, a body corporate of the State of Arizona, acting for and on behalf of Arizona State University, Scottsdale, AZ (US)

(72) Inventors: Lina Karam, Scottsdale, AZ (US); Samuel Dodge, Scottsdale, AZ (US)

(73) Assignee: Arizona Board of Regents, a body corporate of the State of Arizona, acting for and on behalf of Arizona State University, Scottsdale, AZ (US)

( * ) Notice: Subject to any disclaimer, the term of this patent is extended or adjusted under 35 U.S.C. 154(b) by 316 days.

(21) Appl. No.: 13/932,969

(22) Filed: Jul. 1, 2013

(65) Prior Publication Data

US 2014/0016859 A1 Jan. 16, 2014

Related U.S. Application Data

(60) Provisional application No. 61/665,906, filed on Jun. 29, 2012.

(51) Int. Cl.
*G06K 9/46* (2006.01)
*G06K 9/00* (2006.01)

(52) U.S. Cl.
CPC ........... *G06K 9/4604* (2013.01); *G06K 9/0061* (2013.01); *G06K 9/4671* (2013.01)

(58) Field of Classification Search
CPC .......................... G06K 9/4676; G06K 9/6262
USPC ................................................ 382/159, 305
See application file for complete search history.

(56) References Cited

U.S. PATENT DOCUMENTS

| 6,711,293 B1 | 3/2004 | Lowe |
| 6,917,703 B1 | 7/2005 | Steffens et al. |
| 8,175,376 B2 * | 5/2012 | Marchesotti ...... G06F 17/30256 382/159 |

(Continued)

OTHER PUBLICATIONS

Drewes et al. "Interacting with the Computer Using Gaze Gestures", Human-Computer Interaction—Interact 2007 Lecture Notes in Computer ScienceVolume 4663, 2007, pp. 475-488.*

(Continued)

*Primary Examiner* — Ishrat I Sherali
(74) *Attorney, Agent, or Firm* — Byrne Poh LLP

(57) ABSTRACT

Systems, methods, and media for optical recognition are provided. In some embodiments, systems for optical recognition are provided, the systems comprising: at least one hardware processor that: identifies a plurality of fixation points in optically detected data; identifies features of the plurality of fixation points; and identifies one or more characteristics of an object represented in the optically detected data. In some embodiments, methods for optical recognition are provided, the methods comprising: identifying a plurality of fixation points in optically detected data using a hardware processor; identifying features of the plurality of fixation points using the hardware processor; and identifying one or more characteristics of an object represented in the optically detected data using the hardware processor. In some embodiments, non-transitory computer-readable media containing computer-executable instructions that, when executed by a hardware processor, cause the processor to perform these methods for optical recognition are provided.

45 Claims, 5 Drawing Sheets

(56) References Cited

U.S. PATENT DOCUMENTS

| | | | |
|---|---|---|---|
| 8,437,543 B2* | 5/2013 | Chamaret | G06K 9/00664 382/162 |
| 2002/0154833 A1* | 10/2002 | Koch | G06K 9/4628 382/325 |
| 2005/0047647 A1* | 3/2005 | Rutishauser | G06K 9/3233 382/159 |
| 2006/0215922 A1 | 9/2006 | Koch et al. | |
| 2010/0086278 A1* | 4/2010 | Stankiewicz | G06K 9/4671 386/278 |
| 2010/0111370 A1 | 5/2010 | Black et al. | |
| 2011/0249867 A1 | 10/2011 | Haas et al. | |

OTHER PUBLICATIONS

Rao, Rajesh PN, et al. "Eye movements in iconic visual search." (2002).*

Achanta, R., et al., "Frequency-Tuned Salient Region Detection", in Proceedings of the IEEE International Conference on Computer Vision and Pattern Recognition (CVPR '09), Miami Beach, FL, US, Jun. 20-25, 2009, pp. 1597-1604.

Belongie, S. and Malik, J., "Matching with Shape Contexts", in IEEE Workshop on Content-based Access of Image and Video-Libraries (CBAIVL '00), Hilton Head Island, SC, Jun. 12, 2000, pp. 1-7.

Belongie, S., "Shape Matching and Object Recognition Using Shape Contexts", in IEEE Transactions on Pattern Analysis and Machine Intelligence, vol. 24, No. 24, Apr. 2002, pp. 509-522.

Chen, Q., et al., "Real-time Vision-based Hand Gesture Recognition Using Haar-like Features", in Instrumentation and Measurement Technology Conference (IMTC '07), Warsaw, PL, May 1-3, 2007, pp. 1-6.

Conseil, S., et al., "Comparison of Fourier Descriptors and Hu Moments for Hand Posture Recognition", in Proceedings of the European Signal Processing Conference (EUSIPCO '07), 2007, pp. 1-5.

Dalal, N. and Triggs, B., "Histograms of Oriented Gradients for Human Detection", in Proceedings of the 2005 IEEE Conference on Computer Vision and Pattern Recognition (CVPR'05), San Diego, CA, US, Jun. 20-26, 2005, pp. 1-8.

Dardas, N., et al., "Hand Gesture Recognition Using Bag-of-Features and Multi-Class Support Vector Machine", in Proceedings of the 2010 IEEE International Symposium on Haptic Audio-Visual Environments and Games (HAVE '10), Phoenix, AZ, US, Oct. 16-17, 2010, pp. 1-5.

Deng, L.Y., et al., "Shape Context Based Matching for Hand Gesture Recognition", in Proceedings of the IET International Conference on Frontier Computing Theory, Technologies and Applications (IET '10), Taichung, TW, Aug. 4-6, 2010, pp. 436-444.

Erol, A., et al., "Vision-Based Hand Pose Estimation: A Review", in Journal of Computer Vision and Image Understanding, vol. 108, No. 1-2, Oct. 2007, pp. 52-73.

Flusser, J. and Suk, T., "Rotation Moment Invariants for Recognition of Symmetric Objects", in IEEE Transactions on Image Processing, vol. 15, No. 12, Dec. 2006, pp. 3784-3790.

Frintrop, S., et al., "Saliency-based Object Recognition in 3D Data", in Proceedings of 2004 IEEE/RSJ International Conference on Intelligent Robots and Systems (IROS '04), Sendai, JP Sep. 28-Oct. 2, 2004, pp. 2167-2172.

Gonzalez, R.C. and Woods, R.E., "Chapter 10: Image Segmentation", in Digital Image Processing, 3rd Edition, 2008, pp. 711-815.

Griffin, G., et al., "Caltech-256 Object Category Dataset", in Caltech Technical Report, No. CNS-TR-2007-001, 2007, pp. 1-20.

Just, A., et al., "Hand Posture Classification and Recognition using the Modified Census Transform", in Proceedings of the 7th International Conference on Automatic Face and Gesture Recognition (FGR '06), Southampton, UK, Apr. 10-12, 2006, pp. 1-6.

Kampa, K., et al., "Closed-Form Cauchy-Schwarz PDF Divergence for Mixture of Gaussians", in Proceedings of International Joint Conference on Neural Networks (IJCNN '11), San Jose, CA, US, Jul. 31-Aug. 5, 2011, pp. 2578-2585.

Kumar, P.P., et al., "Graph Matching Based Hand Posture Recognition Using Neuro-Biologically Inspired Features", in Proceedings of the 11th International Conference on Control, Automation, Robotics and Vision (ICARCV '10), Singapore, Dec. 7-10, 2010, pp. 1151-1156.

Letessier, J. and Berard, F., "Visual Tracking of Bare Fingers for Interactive Surfaces", in Proceedings of the 17th Annual ACM Symposium on User Interface Software and Technology (UIST '04), Sante Fe, NM, US, pp. 119-122.

Ming-Kuei, H., "Visual Pattern Recognition by Moment Invariants", in IRE Transactions on Information Theory, vol. 8, No. 2, Feb. 1962, pp. 179-187.

Mori, G., et al., "Efficient Shape Matching Using Shape Contexts", in IEEE Transactions on Pattern Analysis and Machine Intelligence, vol. 27, No. 11, Nov. 2005, pp. 1832-1837.

Rajashekar, U., et al., "GAFFE: A Gaze-Attentive Fixation Finding Engine", in IEEE Transactions on Image Processing, vol. 17, No. 4, Apr. 2008, pp. 564-573.

Salvucci, D. and Goldberg, J., "Identifying Fixations and Saccades in Eye-Tracking Protocols", in Proceedings of the Symposium on Eye-Tracking Research and Applications, Palm Beach Gardens, FL, USA, Nov. 6-8, 2000, pp. 71-78.

Triesch, J. and Malsburg, C.V.D., "Robust Classification of Hand Postures Against Complex Backgrounds", in Proceedings of the Second International Conference on Automatic Face and Gesture Recognition (FG '96), Killington, VT, US, Oct. 14-16, 1996, pp. 170-175.

Viola, P. and Jones, M., "Rapid Object Detection using a Boosted Cascade of Simple Features", in Proceedings of the 2001 IEEE Computer Society Conference on Computer Vision and Pattern Recognition (CVPR '01), Kauai, HI, USA. Dec. 8-14, 2001, pp. 511-518.

Wachs, J.P., et al., "Vision-Based Hand-Gesture Applications", in Communications of the ACM, vol. 54, No. 2, Feb. 2011, pp. 60-71.

Walther, D. et al., "Selective Visual Attention Enables Learning and Recognition of Multiple Objects in Cluttered Scenes", in Computer Vision and Image Understanding, vol. 100, 2005, pp. 41-63.

Wang, C., et al., "Attention Driven Face Recognition: A Combination of Spatial Variant Fixations and Glance", in Proceedings of the 2011 IEEE International Conference on Automatic Face and Gesture Recognition and Workshops (FG '11), Santa Barbara, CA, US, Mar. 21-25, 2011, pp. 740-745.

Wiskott, L., et al., "Face Recognition by Elastic Bunch Graph Matching", in IEEE Transactions on Pattern Analysis and Machine Intelligence, vol. 19, No. 7, Jul. 1997, pp. 775-779.

* cited by examiner

SYSTEMS, METHODS, AND MEDIA FOR IDENTIFYING OBJECT CHARACTERISTICS BASED ON FIXATION POINTS

CROSS REFERENCE TO RELATED APPLICATION

This application claims the benefit of U.S. Provisional Patent Application No. 61/665,906, filed Jun. 29, 2012, which is hereby incorporated by reference herein in its entirety.

BACKGROUND

Recognition of characteristics, which can be any suitable trait, activity, aspect, condition, state, etc., of objects, which can be inanimate or animate, is of increasing importance as simpler and more natural human-machine interfaces and better-performing machine vision systems are required by new applications.

Accordingly, new mechanisms for optical recognition are desired.

SUMMARY

Systems, methods, and media for optical recognition are provided. In some embodiments, systems for optical recognition are provided, the systems comprising: at least one hardware processor that: identifies a plurality of fixation points in optically detected data; identifies features of the plurality of fixation points; and identifies one or more characteristics of an object represented in the optically detected data.

In some embodiments, methods for optical recognition are provided, the methods comprising: identifying a plurality of fixation points in optically detected data using a hardware processor; identifying features of the plurality of fixation points using the hardware processor; and identifying one or more characteristics of an object represented in the optically detected data using the hardware processor.

In some embodiments, non-transitory computer-readable media containing computer-executable instructions that, when executed by a hardware processor, cause the processor to perform a method for optical recognition are provided, the method comprising: identifying a plurality of fixation points in optically detected data; identifying features of the plurality of fixation points; and identifying one or more characteristics of an object represented in the optically detected data.

DETAILED DESCRIPTION

Systems, methods, and media for optical recognition are provided.

In some embodiments, optical recognition in video and/or images can be performed using visual fixation points. This optical recognition can be used for recognizing any suitable characteristic (which can be any suitable trait, activity, aspect, condition, state, etc. in some embodiments) of an object (which can be an inanimate object or an animate object in some embodiments) detected in an image and/or a video. For example, the optical recognition can be used to recognize a gesture (e.g., of a hand), an identity or type of an inanimate object, an activity of an animate object, an emotional state of a human, a gender of a person, etc., in some embodiments. In some embodiments, these fixation points can be determined from a visual attention model. In some embodiments, these fixation points can be determined from an eye tracking device. Once the fixation points have been determined for the object of interest, a classification method can be used. In some embodiments, the classification method can use statistical features of the spatial distribution of the fixation points. In some embodiments, the classification method can use geometric features or features derived from the shape of the fixation points. The disclosed approach can be extended to dynamic recognition by using temporal as well as spatial features of the fixation points.

Figure 1:
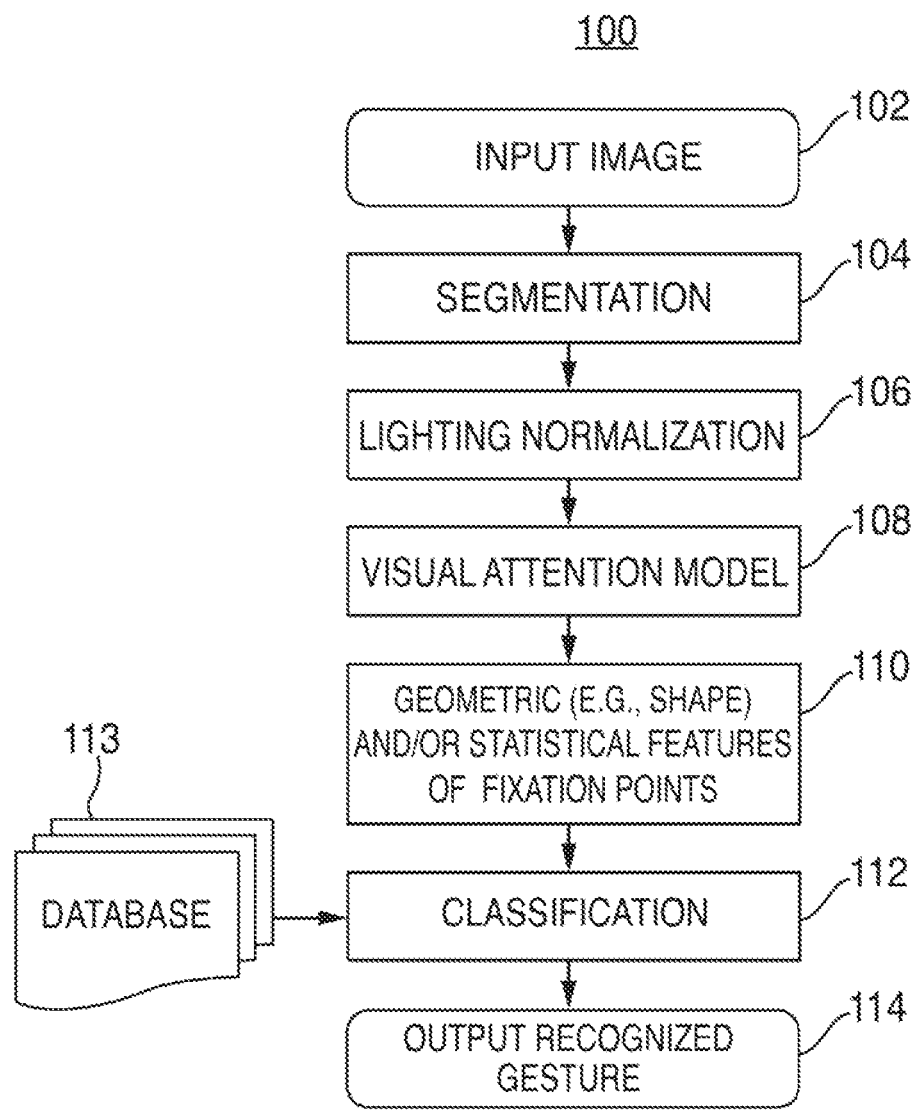
FIG. 1 is a block diagram of an attentive recognition scheme using geometric or statistical features of fixation points from a visual attention model for optical recognition in accordance with some embodiments.

In accordance with some embodiments, an optical recognition scheme can be provided. An example 100 of a process that can be used for such a scheme is illustrated in FIG. 1. As shown, in such embodiments, geometric and/or statistical features of fixation points can be used for optical recognition. The geometric features can include shape context, template matching, and/or any other suitable geometric features in some embodiments. Statistical features can include the mean, the variance, and the higher order moments of the distribution of the fixation points, and/or any other suitable statistical features.

More particularly, as shown in FIG. 1, process 100 can begin by receiving an input image at 102. Any suitable input image can be received from any suitable source, and this image can be in any suitable format. For example, an image can be received as a frame of video, an image file (e.g., a bit map, a JPEG file, etc.), pixel data, etc. As another example, this image can have any suitable spatial resolution and can be based on video having any suitable spatial resolution and/or temporal resolution.

Next, at 104, process 100 can perform segmentation on the input image to segment a hand or other object of interest from a background in the image. This segmentation can be performed in any suitable manner. For example, a hand region can be extracted from a background in an image using known segmentation methods, such as applying an intensity threshold to pixels in the image, which can be selected based on the complexity of the background.

Then, at 106, preprocessing, such as light normalization, can be performed on the segmented image resulting from 104. Such normalization, for example, can be performed in any suitable manner. Additional preprocessing can be performed in some embodiments to prepare the image for the visual attention model. Any suitable preprocessing and/or additional preprocessing can be performed in some embodiments. For example, padding can be added to the border of the segmented image in order to ensure that the hand region does not touch the image border. As another example, the image can be resized using bilinear interpolation or other suitable interpolation method to a common size in some embodiments.

In some embodiments, and for some visual attention models and applications, 104 and 106 may be unnecessary.

At 108, a visual attention model can be used to generate fixation points in a hand or object of interest in the image. Any suitable visual attention model can be used in some embodiments. For example, in some embodiments, the Gaze Attention Fixed Finding Engine (GAFFE) model of Rajashekar, U.; van der Linde, I.; Bovik, A. C.; Cormack, L. K.; "GAFFE: A Gaze-Attentive Fixation Finding Engine," IEEE Transactions on Image Processing, vol. 17, no. 4, pp. 564-573, April 2008, which is hereby incorporated by reference herein in its entirety, can be used. First, the visual attention model can be used to determine salient regions of an image using a combination of features. These features can be regions of high luminance, high contrast, edges, etc. The features can be weighted in such a way to give an accurate analogue of the behavior of the human visual system. This weighted combination of features can be referred to herein as a saliency map. Next, fixation points can be selected based on the saliency map. For example, a fixation point at the center of the image can be selected first in some embodiments. In some embodiments, this first fixation point can be ignored. Then, a filter can be used to simulate the foveation process of the human visual system. Regions far from the current fixation point can be blurred, whereas the region closest to the fixation point can be unaffected. After foveation, the saliency map can then be re-computed. The region around the current fixation point can be inhibited such that the next fixation point will not be too close to the previous point. Any suitable minimum distance can be used in some embodiments. Finally, the next fixation point can be chosen according to the most salient (high value) region from the saliency map. The process can then repeat until a desired number of fixation points have been identified. In some embodiments and for some visual attention models and applications, the foveation process may be unnecessary for identifying the fixation points.

Recognition of characteristics (e.g., gestures, objects of interest, activities, emotional status, gender of a person, etc. as set forth above) can be performed using these fixation points using shape context in a nearest neighbor framework at 110 and 112 in some embodiments.

Figure 4A:
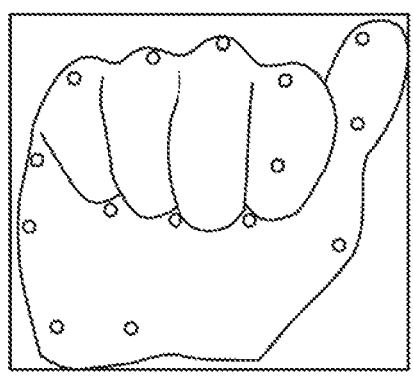
FIGS. 4A and 4B show examples of fixation points for hand gestures in accordance with some embodiments.
Figure 4B:
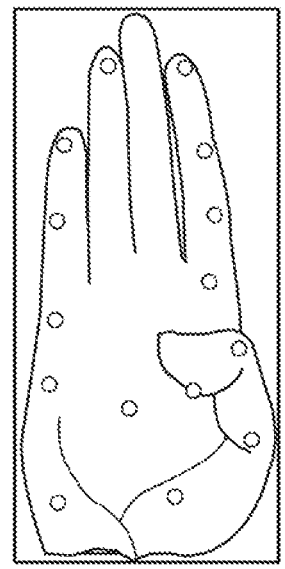
Figure 5A:
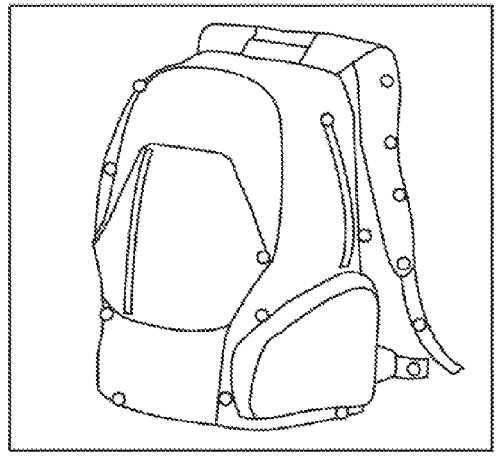
FIGS. 5A-5D show examples of fixation points for objects in accordance with some embodiments.
Figure 5B:
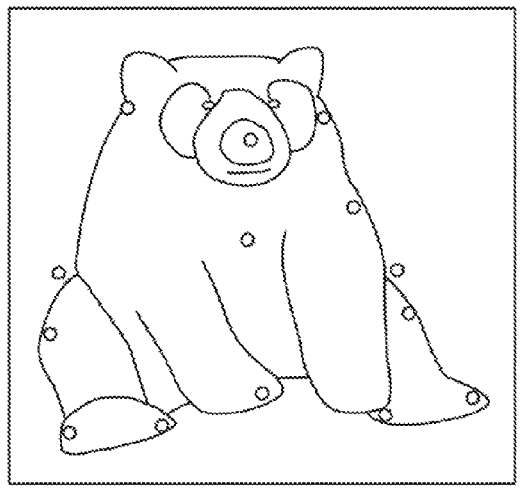
Figure 5C:
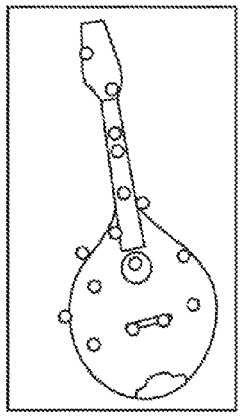
Figure 5D:
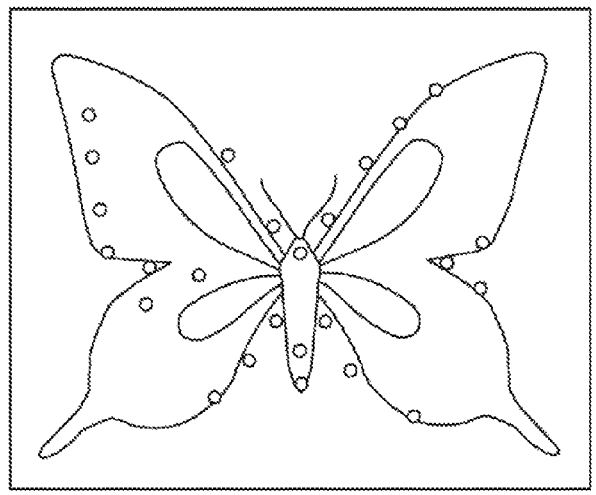

For example, in some embodiments, the fixation points can be used to identify a hand gesture. FIGS. 4A and 4B show examples of fixation points that can be generated in some embodiments. As shown, fixation points can be located at key locations on the hand, such as fingers, knuckles, the thumb, etc. More particularly, for example, as shown in FIG. 4A, the fixation points can outline the hand as well as the ridge of the knuckles. As another example, as shown in FIG. 4B, the fixation points can outline the hand as well as key points such as the thumb. For example, due to variability in hand appearance, a fixation point may be generated in a certain location on one hand, but not at the same location on another. Additionally, the order of fixation points may not always be consistent.

Continuing the present example, classification can next be performed at 112 using, in some embodiments, rule-based or machine learning methods applied to the identified fixation points and associated features or, in some embodiments, by comparing these fixation points to known gestures (e.g., using models of known gestures with defined fixation points that are stored in a database 113) to determine if a gesture is in the image. For example, in some embodiments, a shape context descriptor, such as that presented in Belongie, S.; Malik, J.; "Matching with shape contexts," Content-based Access of Image and Video Libraries, 2000, Proceedings, IEEE Workshop on, pp. 20-26, 2000, which is hereby incorporated by reference herein in its entirety, can be used to compare the fixation points to models of known gestures. This method can attempt to find the best one-to-one correspondence between a point on one shape and a point on another shape. Specifically, a log-polar histogram can be used to uniquely characterize a point on a shape in terms of all other points on the same shape. By comparing these histograms between a point in one shape and a point in another shape, the correspondence between the points of two different shapes can be generated. Once this correspondence is calculated, bipartite graph matching can be used to obtain a metric of distance between two shapes. This distance metric can then be used for classification of a test sample according to the nearest training sample (or known good sample) in some embodiments.

Although this example described the determination of fixation points and classification based on these fixation points as being used to determine a gesture of a hand, such techniques can be used to determine any suitable characteristic (which a gesture is just one example of as described above) of any suitable object (which a hand is just one example of as described above, and which can be inanimate or animate).

In some embodiments and for some classification methods (such as some rule-based and machine learning based classification methods), 113 may be unnecessary.

The recognized characteristic (e.g., a gesture) can then be output at 114

Figure 2:
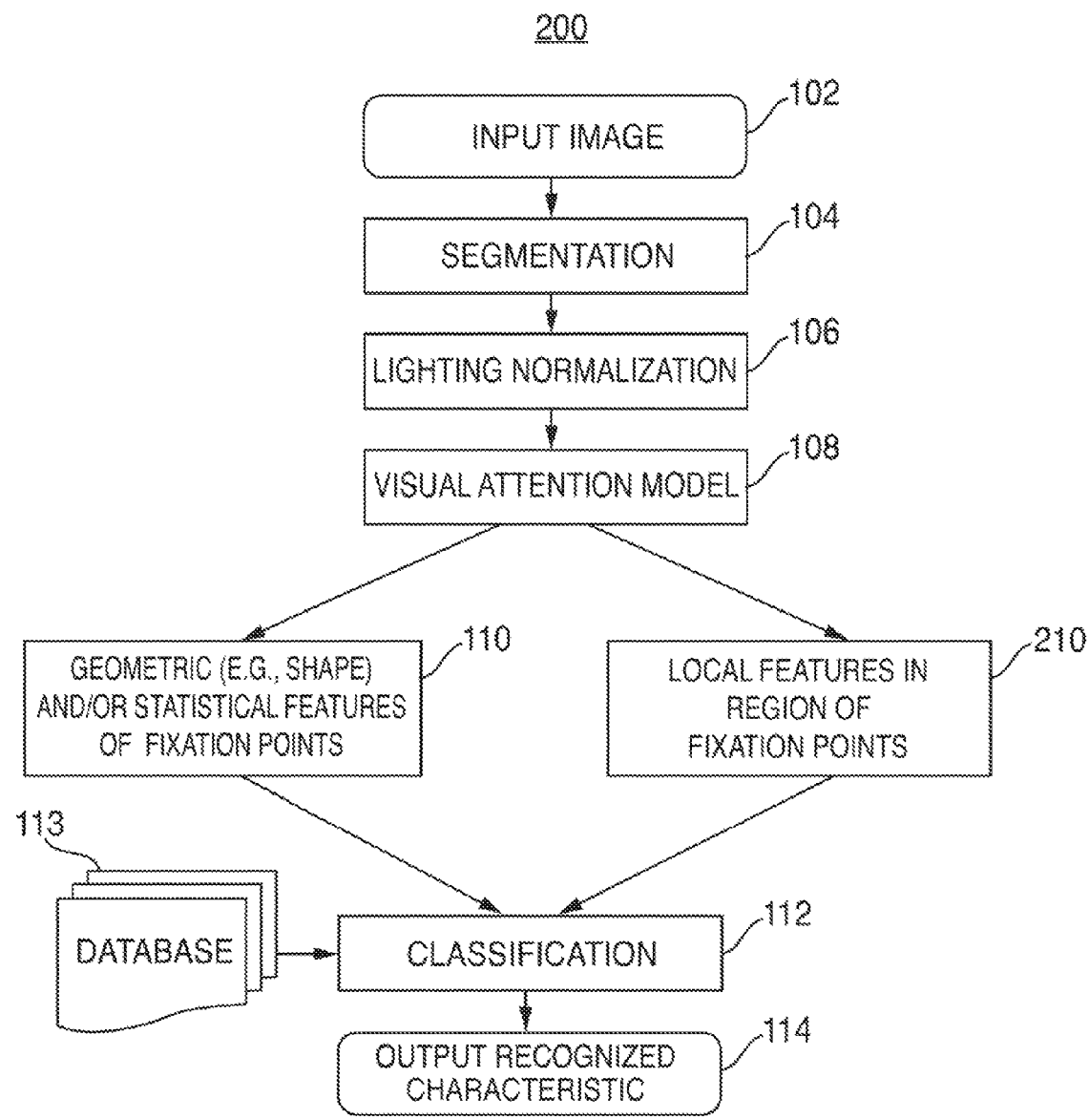
FIG. 2 is a block diagram of an attentive recognition scheme using local image features in the local neighborhood of fixation points in addition to geometric or statistical features of fixation points in accordance with some embodiments.

In some embodiments, and for certain applications, other information in addition to, or alternatively to, one or more geometric and/or statistical distribution(s) of fixation points can be used to recognize characteristics. FIG. 2 illustrates an example 200 of a process for recognizing characteristics using such other information additionally or alternatively to geometric or statistical distribution(s) of fixation points in accordance with some embodiments. As can be seen, in addition to the steps also shown in process 100 of FIG. 1, process 200 adds a step 210 that uses local features in a window surrounding each fixation point to recognize one or more characteristics of an object, which can be inanimate or animate. For example, in some embodiments, this recognition can be performed by comparing these features, additionally or alternatively to geometric or statistical distribution(s) of fixation points to the features of fixation points in a database of known characteristics and the closest (or most similar) can be identified as matching. In some embodiments, this recognition can be performed using rule-based or machine learning methods without the need for a database. Any suitable features can be used, such as color, texture, SIFT features (which are described in N. Dardas, Q. Chen, N. D. Georganas, and E. M. Petriu, "Hand gesture recognition using bag-of-features and multi-class support vector machine," in Proceedings of the IEEE International Symposium on Haptic Audio-Visual Environments and Games (HAVE), October 2010, which is hereby incorporated by reference herein in its entirety), HOG features (which are described in Dalal, N.; Triggs, B.; "Histograms of oriented gradients for human detection," IEEE Computer Society Conference on Computer Vision and Pattern Recognition (CVPR), vol. 1, pp. 886-893, June 2005, which is hereby incorporated by reference herein in its entirety), etc., in some embodiments.

In FIGS. 4A and 4B, it can be seen that for hand postures from the Triesch gesture database (J. Triesch and C. von der Malsburg, "Robust classification of hand postures against complex backgrounds," in Proceedings of the IEEE International Conference on Automatic Face and Gesture Recognition., October 1996, which is hereby incorporated by reference herein in its entirety), fixation points can be placed on the most relevant portions of the hand in some embodiments. Similar results for objects from the Caltech-256 database of objects (Griffin, G.; Holub, A D.; Perona, P.; The Caltech-256, Caltech Technical Report, which is hereby incorporated by reference herein in its entirety) can be observed as shown in FIGS. 5A, 5B, 5C, and 5D in accordance with some embodiments.

In some embodiments, the mechanisms described herein can be used to recognize a static configuration of the hand (i.e., a hand gesture) from a single grayscale image of a hand. In some embodiments, rule based or machine learning based recognition methods can be used to recognize the static configuration of the hand. In some embodiments, a database of hand postures (or hand gestures) can be used, alternatively or additionally to the rule-based and machine learning methods, as a reference against which to compare an unknown gesture in an image for identification purposes.

This database can be used to train the processes described herein in some embodiments. For example, in some embodiments, the process described in FIG. 1 can be applied against an image of a hand gesture in the database and a distance measure between the features (geometric, statistical, or other) of the fixation points of the image and the features of the fixation points of other images for the same hand gesture in the database can be calculated. This distance measure can be used for identifying the hand gesture in subsequently processed images using the processes described herein in some embodiments. This approach can be repeated for other hand gestures in the database in some embodiments.

This database can additionally or alternatively be used to identify any other suitable characteristic(s) in one or more images. For example, after performing the process described in FIG. 1, the distance between the features (geometric, statistical, or other) of the fixation points of an image and those of the fixation points of other images in the database can be calculated and the database image with the closest distance (i.e., the database image that is most similar) can be identified to have the matching characteristic. Additionally or alternatively, images having distances above a threshold can be filtered out in some embodiments. In some embodiments, rule based or machine learning based recognition methods can be used, additionally or alternatively to a database, to identify any other suitable characteristic(s) in one or more images.

Figure 3:
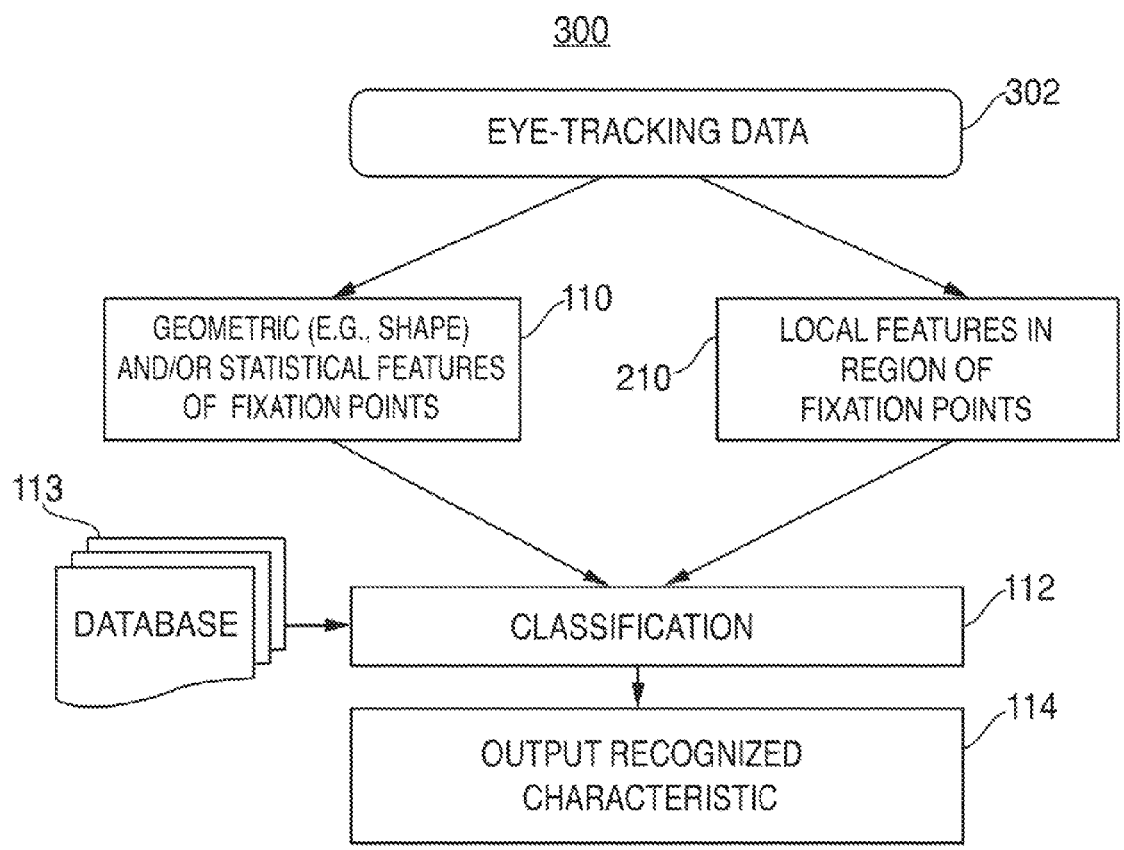
FIG. 3 is a block diagram of a recognition scheme using fixation points from eye tracking data as input instead of fixation points from a visual attention model in accordance with some embodiments.

In some embodiments, fixation points from an eye tracking device can be used for recognition. This can be accomplished in any suitable manner. For example, FIG. 3 illustrates an example 300 of a process for using eye tracking data for recognition in some embodiments. As shown, process 300 includes steps 110, 112, 210, and 114 as described above in connection with FIG. 2. However, as shown in FIG. 3, process 300 includes receiving eye-tracking data to generate true recorded fixation points. This eye-tracking data can be received from any suitable mechanisms in some embodiments. For example, the Eyetech eye tracker (available from EyeTech Digital Systems, Inc. of Mesa, Ariz.), the iView X system (available from Senso-Motoric Instruments, Inc. of Boston, Mass.), the Generation 5.5 SRI Dual Purkinje Image Eyetracker (available from Fourward Optical Technologies, Inc. of Buena Vista, Va.) can be used in some embodiments. In some embodiments, processing of the raw eye tracking data can include separating fixation points from saccadic eye movements. For example, in some embodiments, separating fixation points from saccadic eye movements can be performed using the method of D. Salvucci and J. Goldberg, "Identifying fixations and saccades in eye-tracking protocols," in Proceedings of the Symposium on Eye tracking Research & Applications, 2000, pp. 71-78, which is hereby incorporated by reference herein in its entirety.

One potential application of a process using eye-tracking data is in sign language recognition. Consider the scenario where a sign language user desires to communicate with someone who does not know sign language. A computer can be used to translate the sign language to text or speech. In some embodiments, sign language can be recognized by observing a sequence of fixations as a user watches the signs.

Other possible applications can include entertainment wherein the user can directly control an onscreen avatar in a game, surgery wherein a surgeon can observe medical images or data while maintaining the sterility of equipment, natural control of robotics, and natural human-computer interaction, etc. Still other possible applications are described in J. P. Wachs, M. Kölsch, H. Stern, and Y. Edan, "Vision-based hand-gesture applications," Commun. ACM, vol. 54, pp. 60-71, February 2011, which is hereby incorporated by reference herein in its entirety. Yet other possible applications include interactive multimedia applications such as interactive TV, interactive home, interactive education and training, immersive communications, telehealth, and immersive virtual environments, automated image and video analysis for object recognition, human activity recognition, security and surveillance applications, etc.

Any suitable hardware can be used to perform optical recognition in some embodiments. For example, in some embodiments, a computer for optical recognition can be connected to a source of images and/or eye tracking data such as a camera, an eye-tracking device, a storage device, etc., can be connected to a database of models of known characteristics against which an unknown image can be compared, can be connected to an output device for indicating the identity of a recognized characteristic, etc.

Such a computer can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, such a computer can be a stand-alone device or can be part of another device, such as a personal computer, a personal data assistant (PDA), a tablet computer, a portable email device, a multimedia terminal, a mobile phone, a game console, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for optical recognition, comprising:
   at least one hardware processor that:
   computes a saliency map of an image;
   identifies a plurality of image fixation points in the image based on the saliency map; and
   identifies an object represented in the image by comparing a shape formed by the plurality of image fixation points to a shape formed by a plurality of model fixation points in a model of a known object.

2. The system of claim 1, wherein the image is a video frame.

3. The system of claim 1, wherein the plurality of image fixation points are identified using a visual attention model.

4. The system of claim 1, wherein the plurality of image fixation points are identified by finding salient features of the image.

5. The system of claim 1, wherein the plurality of image fixation points are identified by simulating a foveation process.

6. The system of claim 1, wherein the plurality of image fixation points are identified by blurring at least a portion of the image.

7. The system of claim 1, wherein the shape is characterized and compared using a geometric arrangement of the plurality of image fixation points.

8. The system of claim 1, wherein the shape is characterized and compared using statistical features of the plurality of image fixation points.

9. The system of claim 1, wherein the shape is characterized and compared using a spatio-temporal arrangement of the plurality of image fixation points.

10. The system of claim 1, wherein the identification of the object is performed by comparing the shape formed by the plurality of image fixation points to the shape formed by the plurality of the model fixation points in a database.

11. The system of claim 1, wherein the identification of the object is performed using at least one of a rule-based recognition method or a machine learning based recognition method.

12. The system of claim 1, wherein the object is inanimate.

13. The system of claim 1, wherein the object is animate.

14. A method for optical recognition, comprising:
    computing a saliency map of an image;
    identifying a plurality of image fixation points in the image based on the saliency map using a hardware processor; and
    identifying an object represented in the image by comparing a shape formed by the plurality of image fixation points to a shape formed by a plurality of model fixation points in a model of a known object using the hardware processor.

15. The method of claim 14, wherein the image is a video frame.

16. The method of claim 14, wherein the plurality of image fixation points are identified using a visual attention model.

17. The method of claim 14, wherein the plurality of image fixation points are identified by finding salient features of the image.

18. The method of claim 14, wherein the plurality of image fixation points are identified by simulating a foveation process.

19. The method of claim 14, wherein the plurality of image fixation points are identified by blurring at least a portion of the image.

20. The method of claim 14, wherein the shape is characterized and compared using a geometric arrangement of the plurality of image fixation points.

21. The method of claim 14, wherein the shape is characterized and compared using statistical features of the plurality of image fixation points.

22. The method of claim 14, wherein the shape is characterized and compared using a spatio-temporal arrangement of the plurality of image fixation points.

23. The method of claim 14, wherein the identification of the object is performed by comparing the shape formed by the plurality of image fixation points to the shape formed by the plurality of the model fixation points in a database.

24. The method of claim 14, wherein the identification of the object is performed using at least one of a rule-based recognition method or a machine learning based recognition method.

25. The method of claim 14, wherein the object is inanimate.

26. The method of claim 14, wherein the object is animate.

27. A non-transitory computer-readable medium containing computer-executable instructions that, when executed by a hardware processor, cause the processor to perform a method for optical recognition, the method comprising:
    computing a saliency map of an image;
    identifying a plurality of image fixation points in the image based on the saliency map; and
    identifying an object represented in the image by comparing a shape formed by the plurality of image fixation points to a shape formed by a plurality of model fixation points in a model of a known object.

28. The non-transitory computer-readable medium of claim 27, wherein the image is a video frame.

29. The non-transitory computer-readable medium of claim 27, wherein the plurality of image fixation points are identified using a visual attention model.

30. The non-transitory computer-readable medium of claim 27, wherein the plurality of image fixation points are identified by finding salient features of the image.

31. The non-transitory computer-readable medium of claim 27, wherein the plurality of image fixation points are identified by simulating a foveation process.

32. The non-transitory computer-readable medium of claim 27, wherein the plurality of image fixation points are identified by blurring at least a portion of the image.

33. The non-transitory computer-readable medium of claim 27, wherein the shape is characterized and compared using a geometric arrangement of the plurality of image fixation points.

34. The non-transitory computer-readable medium of claim 27, wherein the shape is characterized and compared using statistical features of the plurality of image fixation points.

35. The non-transitory computer-readable medium of claim 27, wherein the shape is characterized and compared using a spatio-temporal arrangement of the image plurality of fixation points.

36. The non-transitory computer-readable medium of claim 27, wherein the identification of the object is performed by comparing the shape formed by the plurality of image fixation points to the shape formed by the plurality of the model fixation points in a database.

37. The non-transitory computer-readable medium of claim 27, wherein the identification of the object is performed using at least one of a rule-based recognition method or a machine learning based recognition method.

38. The non-transitory computer-readable medium of claim 27, wherein the object is inanimate.

39. The non-transitory computer-readable medium of claim 27, wherein the object is animate.

40. The system of claim 1, wherein the hardware processor further identifies features of the plurality of fixation points.

41. The method of claim 14, wherein the method further comprises identifying features of the plurality of fixation points.

42. The non-transitory computer-readable medium of claim 27, wherein the method further comprises identifying features of the plurality of fixation points.

43. The system of claim 1, wherein the image is optically detected data.

44. The method of claim 14, wherein the image is optically detected data.

45. The non-transitory computer-readable medium of claim 27, wherein the image is optically detected data.

\* \* \* \* \*